United States Patent

[11] 3,621,452

[72] Inventor Eugene Y. Ho
San Carlos, Calif.
[21] Appl. No. 878,424
[22] Filed Nov. 20, 1969
[45] Patented Nov. 16, 1971
[73] Assignee Farinon Electric
San Carlos, Calif.

[54] PHASE DETECTOR AND OSCILLATOR SYSTEM
3 Claims, 7 Drawing Figs.
[52] U.S. Cl. .................................................. 331/25,
307/232, 307/290, 328/133, 331/8, 331/28
[51] Int. Cl. .................................................. H03b 3/04
[50] Field of Search ......................................... 331/1–36;
328/133; 307/232

[56] References Cited
UNITED STATES PATENTS
2,617,040 11/1952 Bailey ........................... 331/28
2,840,711 6/1958 Miller ........................... 331/28
OTHER REFERENCES
K. A. Edwards, AIEE, Vol. 77, Part 1, Jan. 1959, Pgs. 1043-
— 1051

*Primary Examiner*—John Kominski
*Attorney*—Flehr, Hohbach, Test, Albritton & Herbert ABSTRACT: A phase detector comprising two trigger circuits each of which receives an input signal and converts the signal into square wave signals having the same frequency and phase as the input signal, and means for combining, integrating and rectifying the combined signal to provide an output signal which is proportional to the phase difference.

PATENTED NOV 16 1971

EUGENE Y. HO
INVENTOR.

BY Flehr, Hohbach, Test,
Albritton and Herbert
ATTORNEYS

PHASE DETECTOR AND OSCILLATOR SYSTEM

BACKGROUND OF THE INVENTION

This invention relates generally to a phase detector and more particularly to a phase detector for deriving a signal which is representative of the phase between two alternating-current signals.

Multiplex radio communication systems generally include a master oscillator which provides a master or reference frequency. In order to assure that the communication system remains operative should the master oscillator fail for any reason, there are generally provided one or more standby or redundant oscillators or frequency-generating units. These units will then provide the reference frequency in place of the master oscillator. However, it is important that when these units are connected into the system they have the same frequency and phase as the original master oscillator frequency. In the prior art, relatively complex phase detectors and control circuits have been provided for this purpose.

OBJECTS AND SUMMARY OF THE INVENTION

It is an object of the present invention to provide an improved detector circuit especially adapted for use in communication systems.

It is another object of the present invention to provide a detector circuit which generates a correction voltage which is proportional to the phase difference.

The foregoing and other objects are achieved by a circuit which includes two trigger circuits which receive a reference signal and an input signal and generate square wave signals having the same frequency and phase relationship as the input signals; means for combining the square wave signals; and means for receiving the combined signal and providing an output voltage which is proportional to the phase difference.

DESCRIPTION OF THE PREFERRED EMBODIMENT

Figure 1:
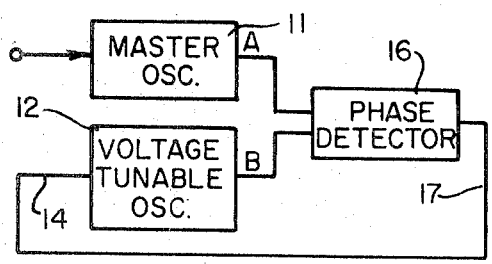
FIG. 1 shows an oscillator system in accordance with the present invention.

Referring to FIG. 1, there is shown a voltage-tunable master oscillator 11 which provides its output on the line A. There is also shown a voltage-tunable slave or redundant oscillator 12. A control signal is applied along the line 14 to the oscillator 12 to control its frequency. The outputs of the oscillators 11 and 12 which appear on lines A and B are applied to a phase detector 16 which serves to detect the phase between the signals and develop on its output line 17 a voltage which is proportional to the phase difference. This voltage is then applied at the input 14 to the voltage-tunable oscillator 12 to maintain the frequency and phase of this oscillator in synchronism with the frequency and phase of the master oscillator. Should the master oscillator fail, the oscillator 12 will then provide the reference frequency.

Figure 2:
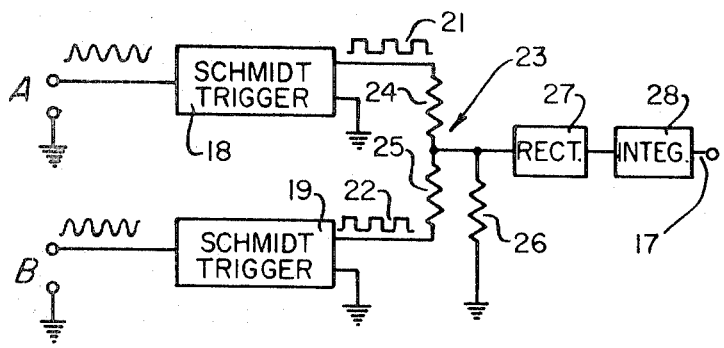
FIG. 2 is a block diagram showing a phase detector in accordance with the present invention.

A schematic block diagram of a phase detector 16 is presented in FIG. 2. The signals appearing on the lines A and B are applied to Schmidt triggers 18 and 19 whose outputs are square waves 21 and 22. These square waves are combined by the combiner 23 which includes resistors 24 and 25 acting in conjunction with the resistor 26. The combined signal is applied to a rectifier circuit 27 which serves to rectify the signals. The output of the rectifier is applied to an integrator 28 which serves to integrate the rectified pulses applied thereto and to provide a DC output voltage at its output 17.

Figure 5:
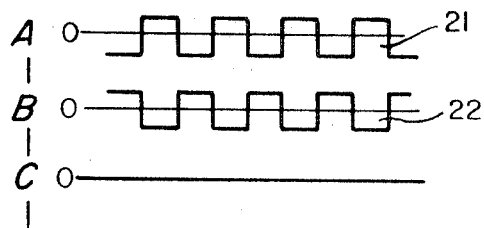
FIGS. 3, 4 and 5 show the output of the trigger circuits for various phase relationships of the input voltages.
Figure 3:
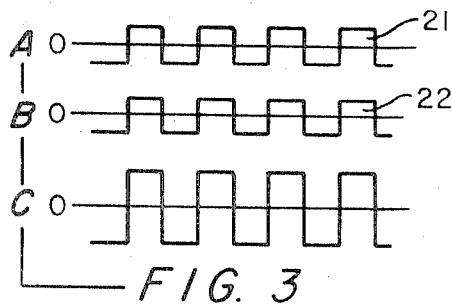
Figure 6:
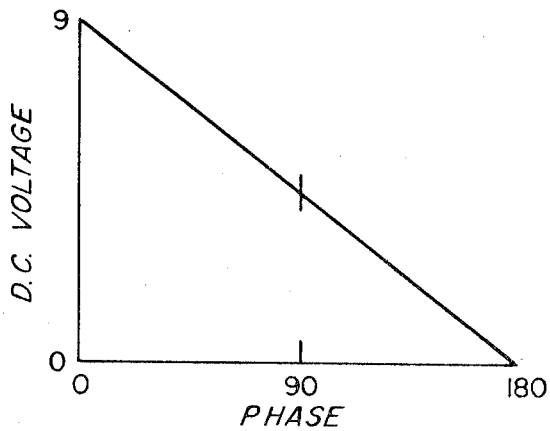
FIG. 6 shows the output voltage as a function of the phase difference between the signals.
Figure 4:
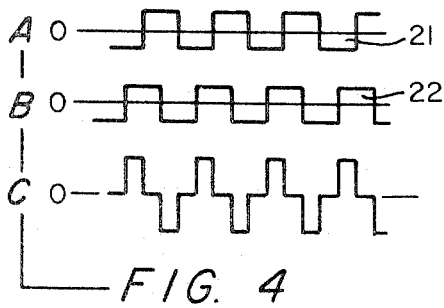

Referring more particularly to FIG. 3, the waveforms 21 and 22 are shown for in phase voltages applied along the lines A and B. The combined voltage is of the form shown in FIG. 3C having maximum pulse height and width. In FIG. 4, the waveforms 21 and 22 are shown 90° out of phase; the combined signal is shown in FIG. 4C. It is seen that the pulse width is essentially one-half the width of the previous pulse width. In FIG. 5, the waveforms 21 and 22 are shown 180° out of phase. It is thus seen that the combined waveforms give a result such as shown in FIG. 5 which is an output pulse having zero pulse width. When the combined signal is rectified and integrated, it provides a DC voltage which is directly proportional to phase. A curve of DC output voltage as a function of phase is shown in FIG. 6. The voltage varies from a maximum value, in this instance shown as 9 volts, when the signals are in phase to a zero voltage when the signals are 180° out of phase.

Figure 7:
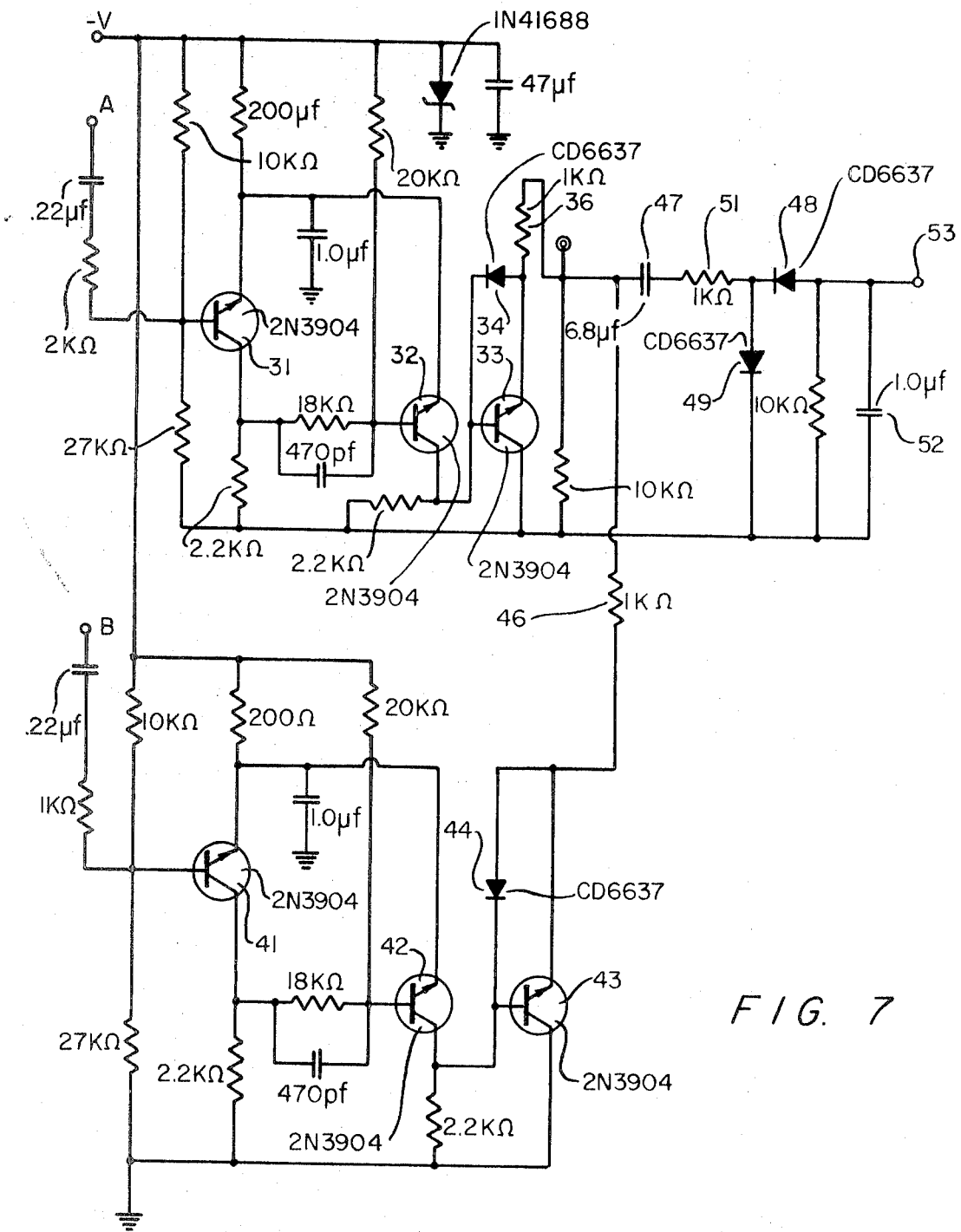
FIG. 7 is a detailed circuit diagram of a phase detector.

Referring now more particularly to the detailed circuit shown in FIG. 7, the input signal on line A is capacitively coupled to the base of transistor 31 which, together with the transistor 32 and associated components, form a trigger circuit. Transistor 33 and diode 34 maintain a constant low impedance across the output of the trigger circuit, collector of transistor 32, regardless of the state of the trigger circuit. When the transistor 32 is conducting, current flows through the diode 34 giving a characteristically low impedance at the collector of transistor 32. When the transistor 32 is turned off, the transistor 33 conducts and presents its characteristic low impedance at its emitter.

The reference signal is applied at the point B and is capacitively coupled to a transistor 41 which together with transistor 42 and the associated circuit components forms a second trigger circuit. Transistor 43 and diode 44 maintain a constant low impedance across the trigger output, collector of transistor 42, regardless of its state. When the transistor 42 is on, current flows through the diode 44 presenting the characteristically low impedance of the collector of transistor 42. When transistor 42 is off, the transistor 43 conducts and presents the low impedance of its emitter.

The square wave signals from each trigger are then combined by the resistors 36 and 46. When the two square wave pulses are in phase, the signals will add, and when out of phase, the signals will cancel. The combined signal is fed to a rectifier and integrating network via the capacitor 47. The diodes 48 and 49 rectify the combined signals, eliminating the unwanted half cycle of the square wave pulses. The resistor 51 and capacitor 42 integrate the rectified pulses providing a DC output at the terminal 53 which is proportional to the pulse width. This, in turn, varies with the phase difference between the incoming signals. With a circuit having the component values shown, the output voltage for a 90° phase relationship was 5 volts being greater at less than 90° phase relationship and less for greater than 90° relationship.

Thus, there has been provided an improved phase detector for use in a redundant oscillator system.

I claim:

1. A phase detector for detecting the phase difference between first and second alternating-current signals comprising a first and a second trigger circuit connected to receive the first and second alternating-current signals respectively and each serving to generate a square wave signal, combining means connected to receive the square wave signals from said first and second trigger circuits, said combining means including first and second resistors connected to said first and second trigger circuits and a common resistor for combining the square wave signals, and means for receiving the combined signals from the common resistor and generate a DC voltage which is proportional to the phase difference between the AC signals and also a DC voltage when either one of said first and second alternating-current signals are absent.

2. A phase detector as in claim 1 wherein said last-named means comprises a rectifier for rectifying the combined signals and an integrator for receiving and integrating the output of the rectifier.

3. A voltage-controlled oscillator serving to generate a first input signal and a source of reference signal, first and second trigger circuits connected to receive said oscillator frequency and said reference frequency respectively and generate square wave signals, combining means for receiving said two square wave signals, said combining means including first and second resistors connected to said first and second trigger circuits and a common resistor for combining the square wave signals, and means for receiving the combined signals from said common resistor and generating a DC voltage which is proportional to the phase difference between the oscillator frequency and the reference frequency and also a DC signal should the reference frequency fail, and means for applying said DC voltage to said voltage-controlled oscillator to control its frequency and maintain the same in phase with the reference frequency or at a mean frequency should the reference frequency fail.

* * * * *